United States Patent [19]

Petri

[11] Patent Number: 4,883,856
[45] Date of Patent: Nov. 28, 1989

[54] FLAME-RESISTANT POLYCARBONATES, CONTAINING IN THEIR POLYMERIC CHAIN UNITS DERIVING FROM MONO-HALOGENATED TETRA-PHENYL COMPOUNDS

[75] Inventor: Alberto Petri, Milan, Italy

[73] Assignee: Enichem Tecnoresine, S.p.A., Palermo, Italy

[21] Appl. No.: 218,818

[22] Filed: Jul. 13, 1988

[30] Foreign Application Priority Data

Sep. 11, 1987 [IT] Italy .............................. 21895 A/87

[51] Int. Cl.$^4$ ............................................ C08G 63/68
[52] U.S. Cl. .................................... 528/202; 528/199; 528/204
[58] Field of Search .................... 528/202, 204, 199

[56] References Cited

U.S. PATENT DOCUMENTS 4,426,513 1/1984 Mark .................................. 528/204

Primary Examiner—Theodore E. Pertilla
Attorney, Agent, or Firm—Hedman, Gibson, Costigan & Hoare

[57] ABSTRACT

Thermoplastic, branched, high-molecular weight polycarbonates endowed with properties of flame-resistance (self-extinguishing polycarbonates) are characterized by the presence in their polymeric chain of units deriving from a di-hydroxy-aromatic compound having the formula:

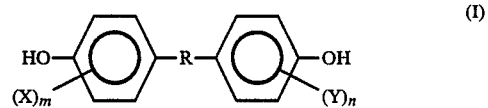

wherein:
R is a single bond; or is a substituted or non-substituted, linear or branched alkyl group containing from 1 to 5 carbon atoms; or is a group selected from O, S, $SO_2$, CO;
X and Y are equal to, or different from, each other and stay for H or $CH_3$;
m and n are integers, equal to or different from each other, ranging from 1 to 4;
and of units deriving from a mono-halogenated tetraphenyl compound having the formula:

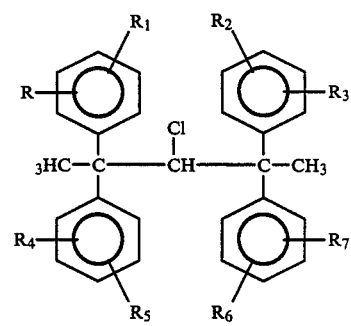

wherein:
R, $R_2$, $R_4$, $R_6$ stay for OH;
$R_1$, $R_3$, $R_5$, $R_7$, either equal to, or different, from one another, stay for OH, H, or a linear or branched alkyl group of from 1 to 5 carbon atoms.

6 Claims, No Drawings

FLAME-RESISTANT POLYCARBONATES, CONTAINING IN THEIR POLYMERIC CHAIN UNITS DERIVING FROM MONO-HALOGENATED TETRA-PHENYL COMPOUNDS

The present invention relates to thermoplastic, branched, high-molecular weight polycarbonates endowed with properties of flame-resistance.

Polycarbonates are known in the art thanks to their excellent physical and mechanical properties, such as, e.g., their high impact strength and their considerable dimensional and thermal stability.

Owing to the more and more increasing demand for materials which, due to safety reasons, are also endowed, besides excellent mechanical properties, with self-extinguishing properties, several methods have been provided in the art in order to give polycarbonates self-extinguishing properties.

One from most commonly used methods is based on the introduction in the polycarbonate of halogens, mainly bromine and chlorine.

The halogens can be introduced in the polymer as additives, by using organic substances, in general polyhalogenated organic substances, as disclosed, e.g., in U.S. Pat. No. 3,357,942, together with, if so desired, additives having a synergistic action, such as, e.g., antimony oxide (J. T. Howarth et al., Plastic World, pages 64–74, March, 1973).

It is furthermore known to bind, by chemical bonds, the halogens to the polymeric chain by using difunctional phenols, such as, e.g., tetra-bromo-bisphenol A and tetra-chloro-bisphenol A, as comonomers in the preparation of the same polycarbonate (U.S. Pat. No. 3,334,154).

However, the halogenated substances known in the prior art, whether they are additives, or monomers to be incorporated with the polymeric chain, should be used in rather considerable amounts, in order to be able to give polycarbonate the desired self-extinguishing properties.

If, on one hand, the presence in the polycarbonate of considerable amounts of halogens gives the same polymer flame-resistance properties, on the other hand it causes a degradation of polycarbonate during the processing steps, thus causing a decay in the physical and mechanical properties typical of non-halogenated polycarbonate.

Furthermore, the high temperatures required for polycarbonate processing may cause the degradation of the halogenated compounds, and the release of hydrogen halides with consequent damages owing to machinery corrosion.

Therefore, the problem not solved in the art consists in obtaining polycarbonates endowed with self-extinguishing properties, which maintain unchanged all their typical chemical, physical and mechanical properties.

The present Applicant has found now that such a problem can be solved, and thermoplastic, branched, high-molecular-weight polycarbonates endowed with flame-resistance properties can be obtained by means of the copolymerization with a mono-halogenated tetra-phenyl compound, used in small amounts, anyway smaller than those causing undesired changes in polymer properties.

More particularly, according to the present invention, such polycarbonates are characterized by the presence in their polymeric chain, of units deriving from a di-hydroxy-aromatic compound having the formula:

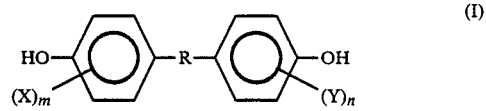

wherein:
R is a single bond; or is a substituted or non-substituted, linear or branched alkyl group containing from 1 to 5 carbon atoms; or is a group selected from 0, S, $SO_2$, CO;

X and Y are equal to, or different from, each other and stay for H or $CH_3$;

m and n are integers, equal to or different from each other, ranging from 1 to 4;

and of units deriving from a mono-halo-tetra-phenyl compound having the formula:

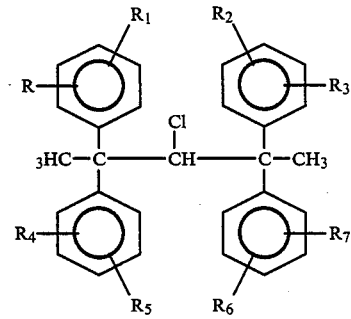

wherein:
R, $R_2$, $R_4$, $R_6$ stay for OH $R_1$, $R_3$, $R_5$, $R_7$, either equal to, or different, from one another, stay for OH, H, or a linear or branched alkyl group of from 1 to 5 carbon atoms.

In order that such polycarbonates may show self-extinguishing properties, it is enough that in the polymeric chain from 0.05 to 5 units deriving from (II), and preferably from 0.2 to 1 units deriving from (II), are present per each 100 units deriving from (I).

Some examples of di-hydroxy-aromatic compounds (I) which can be used are the following:
4,4'-dihydroxy-diphenyl;
2,2-bis(4-hydroxyphenyl)propane (bisphenol A);
2,2-bis(3,5-dimethyl-4-hyqroxyphenyl)propane;
bis(4-hydroxyphenyl)-methane; and so forth.

The polycarbonates according to the present invention can also contain units deriving from compounds with only one aromatic, divalent ring, such as resorcinol and hydroquinone.

The mono-halogenated tetra-phenyl compounds (II) can be prepared according to methods known in the art.

Some examples of mono-halogenated tetra-phenyl compounds suitable for the purposes of the present invention are:
3-chloro-2,2,4,4-tetrakis(4'-hydroxyphenyl)pentane;
3-chloro-2,2,4,4-tetrakis(3',5'-dihydroxyphenyl)-pentane;
3-chloro-2,2,4,4-tetrakis(4'-hydroxy-6'-methylphenyl)-pentane;
3-chloro-2,2,4,4-tetrakis(3',5'-hydroxy-6'-methylphenyl)pentane.

The self-extinguishing polycarbonates according to the present invention can be prepared according to one from the polycondensation methods as reported in the prior art.

For example, according to the method of interface polycondensation, the dihydroxy-aromatic compound (I) is dissolved in an aqueous solution of sodium hydroxide, and to such a solution an organic solvent immiscible with water, e.g., methylene chloride, containing the monohalogenated tetra-phenyl compound is added (II).

Through the so-obtained mixture phosgene gas is bubbled and the reaction temperature is maintained within the range of from 15° to 25° C. for a time of from 20 minutes to 6 hours, in the presence of a molecular weight control agent, e.g., a mono-functional phenol, and of a phase-transfer catalyst, such as, e.g., a tertiary amine.

The so-obtained polycarbonate is isolated by washing the organic phase according to known techniques and the by distilling off the solvent, or by precipitation with a non-solvent.

According to a preferred form of practical embodiment of the invention, the reaction of interface polycondensation is carried out by using, instead of phosgene, chloroformyl-terminated polycarbonate oligomers (having a molecular weight generally comprised within the range of from 400 to 2000), obtained by means of the interface reaction between phosgene and a dihydroxyaromatic compound.

Another possibility of obtaining the polycarbonates of the present invention consists in the well-known methodology of polycondensation in solution. In this case, phosgene is bubbled through a solution of methylene chloride and pyridine, containing the dihydroxy-aromatic compound (I), the mono-halogenated tetra-phenyl compound (II) and the mono-functional phenol as the molecular weight control agent.

Said polycarbonates can be obtained as well by transesterification in the molten state, by reacting the dihydroxyaromatic compound and the mono-halogenated tetra-phenyl compound with diaryl, di-alkyl or alkyl-aryl carbonates, at a temperature comprised within the range of from 100° to 300° C., in the presence of transesterification catalysts.

The polycarbonates obtained by means of any one of the above disclosed methods can be both linear and branched, and have a molecular weight comprised within the range of from 20,000 to 30,000. They maintain unchanged all the typical characteristics of the thermoplastic materials, and are suitable for being processed both by the injection-moulding technique, and by extrusion and/or blow-moulding.

Said polycarbonates result classifiable as V-0 in fire-behaviour, evaluated according to UL94 standard (Underwriters' Laboratories Inc. Bulletin S 4), and carried out on specimens of 3.2 mm of thickness, obtained by injection-moulding or compression-moulding.

According to this Standard, the materials are classified as V-0; V-1; V-2, on the basis of the results, obtained with the five specimens, according to the following criterion:

V-0: None of specimens shall show a combustion time longer than 10 seconds after the removal from the flame of a Bunsen burner. The total combustion time for the five specimens (ten ignitions) may not exceed 50 seconds. None of specimens shall let drop burning particles, igniting the surgical cotton positioned along the vertical under the specimen at the distance of 305 mm.

V-1: None of specimens shall show a combustion time longer than 30 seconds after the removal from the flame of a Bunsen burner. The total combustion time for the five specimens (ten ignitions) shall not exceed 250 seconds. None of specimens shall let drop burning particles, igniting the surgical cotton positioned along the vertical under the specimen at the distance of 305 mm.

V-2: None of specimens shall show a combustion time longer than 30 seconds after the removal from the flame of a Bunsen burner. The total combustion time for the five specimens (ten ignitions) shall not exceed 250 seconds. The specimens may let drop burning particles igniting the surgical cotton positioned along the vertical under the specimen at the distance of 305 mm.

Moreover, all the five specimens must pass the test according to UL-94 Standard, otherwise they are given a rating on the basis of the behaviour of the worst specimen. If, for instance, a specimen shows a V-2 behaviour and the other four specimens show a V-0 behaviour, all five specimens are given a rating V-2. Finally, if a specimen continues burning over more than 30 seconds after being removed from the flame of a Bunsen burner, it does not receive a rating according to UL-94 Standard, but is classified as a burning specimen.

The specimens are furthermore submitted to the test of behaviour to fire according to ASTM D 2863-77, Standard, which correlates the flammability of a polymeric material with the concentration of oxygen present in the atmosphere under which the same specimen is tested. This correlation is expressed as L.O.I. (Limiting Oxygen Index), i.e., as the minimum oxygen percentage capable of maintaining the combustion of the specimen under an oxygen-nitrogen atmosphere impinging against the same specimen by flowing from down upwards.

On the polycarbonates of the present invention, also the following characteristics were measured:

Intrinsic Viscosity ($\eta$)
   This property is determined in methylene chloride at 20° C. by means of the Ubbelhode viscometer, and is expressed as dl/g.

Melt Flow Index (MFI)
   The evaluation of melt flow index is carried out by means of the melt indexer, on the extruded granulate, under a load of 1.2 kg and at the temperature of 300° C., according to ASTM D 1238.

Impact Strength (IZOD)
   Is evaluated on notched specimens at 0° C. according to ASTM D 256.

Shear Sensitivity (SS)
   The evaluation of this quantity is carried on the melt indexer, on the granulate extruded under loads of 1.2 and 12 kg, at the temperature of 300° C., according to ASTM D 1238.

The following experimental examples are supplied for illustrative purposes, and should not be construed as being limitative of the purview of the same invention.

EXAMPLE 1

Preparation of 3-Chloro-2,2,4,4-tetrakis-(4'-hydroxyphenyl)pentane

To a flask of 250 ml of capacity, fitted with reflux condenser, thermometer and magnetic stirrer, 188 g (2 mol) of phenol and 26.8 g (0.2 mol) of 3-chloro-2,4-pentane-dione are charged.

The reaction mixture is heated to 75° C. and is then saturated with hydrogen chloride gas, separately generated by means of the addition of an aqueous solution thereof (at 37%) to a concentrated sulphuric acid solution (96%).

When the saturation is complete, the feed of hydrogen chloride gas is discontinued, and the mixture is then heated up to 120° C. and is maintained at such a temperature, with stirring, for 12 hours. At the end of such time period, the reaction mixture is cooled to room temperature, and to it 2,400 ml of ethyl ether is added.

The reaction product, which precipitates off, is recovered by filtration under vacuum, washing with ether and drying in oven under vacuum, at 70° C., for 3 hours.

The so obtained raw product is purified by continuous extraction in a Kumagawa stripper with boiling ethyl ether, for 8 hours.

In that way, 27 g is obtained of 3-chloro-2,2,4,4-tetrakis(4'-hydroxyphenyl)pentane, with a yield of approximately 30%.

The elemental analysis gave the following results:
C 72.9%; H 5.6%; Cl 7.7% (found)
C 73.4%; H 5.7%; Cl 7.5% (theoretical).

The structure was confirmed by spectroscopic analysis, NMR and mass spectrometry.

EXAMPLE 2

Preparation of 3-Chloro-2,2,4,4-tetrakis-(3',5'-dihydroxyphenyl)pentane

To a flask of 250 ml of capacity, fitted with reflux condenser, thermometer and magnetic stirrer, 44 g (0.4 mol) of resorcinol and 6.7 g (0.05 mol) of 3-chloro-2,4-pentane-dione are charged.

The reaction mixture is heated to 75° C. and is then saturated with hydrogen chloride gas, separately generated by means of the addition of an aqueous solution thereof (at 37%) to a concentrated sulphuric acid solution (96%).

When the saturation is complete, the feed of hydrogen chloride gas is discontinued, and the mixture is then heated up to 120° C., and is maintained at such a temperature, with stirring, for 5 hours.

At the end of such time period, the reaction mixture is cooled to room temperature, and to it 500 ml of water is added.

The reaction product is separated by centrifugation, is washed with 300 ml of water and is centrifuged again and is finally dried in an oven, under vacuum, at 120° C. for 3 hours.

The so-obtained raw product is then purified by dispersion in 500 ml of ethyl ether, with the suspension being kept stirred for 30 minutes.

At the end, the reaction product is filtered and dried again in oven under vacuum for 3 hours at 70° C.

In that way, 5.4 g is obtained of 3-chloro-2,2,4,4-tetrakis(3',5'-di-hydroxyphenyl)pentane, with a yield of 21%.

The elemental analysis gave the following results:
C 65.0%; H 4.9%; Cl 6.9% (found)
C 64.6%; H 5.0%; Cl 6.6% (theoretical).

The structure was confirmed by spectroscopic analysis, NMR and mass spectrometry.

EXAMPLE 3

To a glass reactor of 3 l of capacity, maintained at the controlled temperature of 25° C., 84 g of bisphenol A, 612 mg of 3-chloro-2,2,4,4-tetrakis(4'-hydroxyphenyl)pentane (equivalent to 0.35 mol % relatively to bisphenol A), 65.2 g of sodium hydroxide dissolved in 650 ml of water, 20 mg of sodium dithionite (a reducing agent, in order to prevent coloured byproducts from being formed) and 6.3 ml of an 0.5 N aqueous solution of triethylamine are charged under nitrogen.

Then, 2.7 g of p-tert.-butyl-phenol dissolved in 1,300 ml of methylene chloride are added, and through the mixture, vigorously stirred, 44 g of phosgene gas is bubbled within 30 minutes.

The reaction is continued for 2 hours, with aqueous sodium hydroxide (at 20% by weight) being added in order to maintain pH at a value higher than 11.

At the end, the reaction mixture is diluted with 500 ml of methylene chloride and the organic phase is separated and is subsequently washed with 300 ml of water (twice), 800 ml of 0.1 N hydrochloric acid and, finally, with portions of 600 ml of water up to neutrality.

At the end, the polymer is recovered by distilling off the organic solvent, is dried and ground until a powder is obtained.

The so obtained polycarbonate is then extruded at the temperature of 260° C. and the extrudate is then cooled and granulated.

The granules are moulded both by compression-moulding (285° C., 40 Jkg/cm$^2$), and by injection-moulding (at approximately 300° C.), in order to obtain specimens of (127×6.5×3.2) mm of dimensions.

Five specimens are submitted to the test of behaviour to fire according to UL 94 standard.

They receive a V-0 classification, according to the data as reported in Table 1.

The other characteristics of the polycarbonate are reported in Table 2.

EXAMPLE 4

The example 3 is repeated with the same operating modalities and reactant amounts, except that 655 mg of 3-chloro-2,2,4,4-tetrakis(3',5'-dihydroxyphenyl)pentane (0.33 mol % relatively to total bisphenol A) is added in place of 3-chloro-2,2,4,4-tetrakis(4'-hydroxyphenyl)pentane.

At the test for flame resistance according to UL-94 standard, the polycarbonate receives a V-0 rating (see Table 1).

The other characteristics of the polymer are shown in Table 2.

EXAMPLE 5

The example 3 is repeated with the same operating modalities and reactant amounts, except that no halogenated tetra-phenyl compounds are added.

At the test for flame resistance according to UL-94 standard, the polycarbonate receives a V-2 rating (see Table 1).

The other characteristics of the polymer are shown in Table 2.

EXAMPLE 6

215.7 g of chloroformyl-terminated polycarbonate oligomers (number average molecular weight = 649; terminal chloroformyl groups = 2,735 meq/kg; terminal hydroxy groups = 347 meq/kg), prepared from bisphenol A, phosgene and p-tert.-butyl-phenol and dissolved in 900 ml of methylene chloride, are charged under nitrogen to a glass reactor of 2.5 liters of capacity, maintained at the controlled temperature of 25° C.

While the so prepared solution is kept stirred by means of a double-anchor stirrer (300 rpm), to it 50 ml of water containing 2.7 g of 3-chloro-2,2,4,4-tetrakis(4'-hydroxyphenyl)pentane (equivalent to 0.57 mol % relatively to bisphenol A), 2.6 g of sodium hydroxide, 31 mg of sodium dithionite and 5 ml of 0.05 N aqueous solution of triethylamine are added in the order as stated.

After 40 minutes, 300 ml of water containing 50 g of bisphenol A and 18.8 g of sodium hydroxide are added and then 92 ml of an aqueous solution of sodium hydroxide at 20% (by weight) is charged within a 10-minute time by using a metering pump.

140 minutes later, the mixture is poured into 2,200 ml of methylene chloride; the organic phase is then separated and washed, in the order, with 450 ml of water (twice); 1,300 ml of 0.15 N aqueous sodium hydroxide (3 times); 900 ml of water (twice); 1,300 ml of 0.1 N hydrochloric acid and, finally, with portions of 900 ml of water up to neutrality.

The polymer is recovered by distilling off the organic solvent, and is dried and ground until a powder is obtained.

The so obtained polycarbonate is then extruded at the temperature of 260° C. and the extrudate is then cooled and granulated.

The granules are moulded both by injection-moulding and by compression-moulding, in order to obtain specimens of (127×6.5×3.2) mm of dimensions.

Five specimens are submitted to the test of behaviour to fire according to UL 94 standard and receive a V-0 classification, according to the data as reported in Table 1.

The other characteristics of the polycarbonate are reported in Table 2.

EXAMPLE 7

The example 6 is repeated with the same operating modalities and reactant amounts, except that 4.0 g of 3-chloro-2,2,4,4-tetrakis(4'-hydroxyphenyl)pentane (0.87 mol % relatively to total bisphenol A) is added.

The polycarbonate obtained receives a V-0 rating at the test for flame resistance, evaluated according to UL-94 standard.

The results of carried out tests are reported in Table 1.

The other characteristics of the polycarbonate are shown in Table 2.

EXAMPLE 8

The example 6 is repeated with the same operating modalities and reactant amounts, except that 1.4 g of 3-chloro-2,2,4,4-tetrakis(3',5'-di-hydroxyphenyl)pentane (0.27 mol % relatively to total bisphenol A) is added in place of 3-chloro-2,2,4,4-tetrakis(4'-hydroxyphenyl)pentane.

The polycarbonate obtained receives a V-0 rating at the test for flame resistance, evaluated according to UL-94 standard.

The results of carried out tests are reported in Table 1.

The other characteristics of the polycarbonate are shown in Table 2.

EXAMPLE 9

The example 6 is repeated with the same operating modalities and reactant amounts, except that 2.2 g of 3-chloro-2,2,4,4-tetrakis(4'-hydroxyphenyl)pentane (0.41 mol % relatively to total bisphenol A) is added.

The polycarbonate obtained receives a V-0 rating at the test for flame resistance according to UL-94 standard.

The results of carried out tests are reported in Table 1.

The other characteristics of the polycarbonate are shown in Table 2.

EXAMPLE 10

The example 6 is repeated with the same operating modalities and reactant amounts, except that no halogenated tetra-phenyl compounds are added.

The polycarbonate obtained receives a V-2 rating at the test for flame resistance, evaluated according to UL-94 standard.

The results of carried out tests are reported in Table 1.

The other characteristics of the polycarbonate are shown in Table 2.

TABLE 1

| Example | Total Combustion Time of 5 Specimens (10 Ignitions), seconds | Maximum Combustion Time for Specimens (2 Ignitions) (seconds) | UL-94 Rating |
| --- | --- | --- | --- |
| 3 | 45 | 10 | V-0 |
| 4 | 37 | 8 | V-0 |
| 5 | 98 | 22 | V-2 |
| 6 | 42 | 9 | V-0 |
| 7 | 29 | 8 | V-0 |
| 8 | 36 | 10 | V-0 |
| 9 | 44 | 9 | V-0 |
| 10 | 102 | 25 | V-2 |

TABLE 2

| Example | 20° C. [η] CH$_2$Cl$_2$ (dl/g) | L.O.I. (%) | Izod Impact (J/m) | MFI (300° C., 1.2 kg) (g/10 min) | S.S. (300° C., 1.2 & 12 kg) |
| --- | --- | --- | --- | --- | --- |
| 3 | 0.584 | 36 | 750 | 3.8 | 21.2 |
| 4 | 0.547 | 34 | 762 | 5.1 | 19.7 |
| 5 | 0.510 | 27 | 743 | 9.2 | 13.6 |
| 6 | 0.620 | 36 | 732 | 2.0 | 25.7 |
| 7 | 0.778 | 38 | 767 | 0.8 | 36.0 |
| 8 | 0.539 | 35 | 790 | 7.9 | 19.8 |
| 9 | 0.569 | 36 | 800 | 4.2 | 21.1 |
| 10 | 0.516 | 26 | 778 | 8.6 | 13.2 |

I claim:

1. Thermoplastic, branched, high-molecular-weight polycarbonates endowed with flame-resistance properties characterized in that they contain in their polymeric chain, units derived from a di-hydroxy-aromatic compound having the formula:

$$HO-\underset{(X)_m}{\underset{|}{\bigcirc}}-R-\underset{(Y)_n}{\underset{|}{\bigcirc}}-OH \quad (I)$$

wherein:
R is a single bond; or a substituted or non-substituted, linear or branched alkyl group containing from 1 to 5 carbon atoms; or a group selected from O, S, SO$_2$, and CO;

X and Y are the same as, or different from each other and are selected from H and CH$_3$;

m and n are integers, the same as, or different from each other, and are selected from 1 to 4; and units derived from a mono-halo-tetra-phenyl compound having the formula:

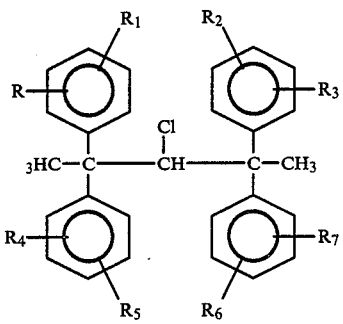 (II)

wherein

R, R$_2$, R$_4$, R$_6$ are OH;

R$_1$, R$_3$, R$_5$, R$_7$, are the same as, or different, from one another, and are selected from OH, H, and a linear or branched alkyl group having from 1 to 5 carbon atoms.

2. Polycarbonates according to claim 1, characterized in that they contain in the polymeric chain from 0.05 to 5 units derived from formula (II), per 100 units derived from formula (I).

3. Polycarbonates according to claim 2, characterized in that they contain in the polymeric chain from 0.2 to 1 units derived from formula (II), per 100 units derived from (I).

4. Polycarbonates according to claim 1, characterized in that the di-hydroxy-aromatic compound (I) is selected from:
 4,4'-dihydroxy-diphenyl;
 2,2-bis(4-hydroxyphenyl)propane;
 2,2-bis(3,5-dimethyl-4-hydroxyphenyl)propane; and
 bis(4-hydroxyphenyl)-methane.

5. Polycarbonates according to claim 1, characterized in that the mon-halogenated tetra-phenyl compound (II) is selected from:
 3-chloro-2,2,4,4-tetrakis(4'-hydroxyphenyl)pentane;
 3-chloro-2,2,4,4-tetrakis(3',5'-dihydroxyphenyl)-pentane;
 3-chloro-2,2,4,4-tetrakis(4'-hydroxy-6'-methylphenyl)-pentane; and
 3-chloro-2,2,4,4-tetrakis(3',5'-hydroxy-6'-methylphenyl)pentane.

6. Polycarbonates according to claim 1, characterized in that they have a molecular weight within the range of from 20,000 to 30,000.

* * * * *